United States Patent [19]
Harrison et al.

[11] 3,869,676
[45] Mar. 4, 1975

[54] DIODE-QUAD BRIDGE CIRCUIT MEANS

[75] Inventors: Dean R. Harrison, Sunnyvale; John Dimeff, San Jose, both of Calif.

[73] Assignee: The United States of America as represented by the Administrator of the National Aeronautics and Space Administration, Washington, D.C.

[22] Filed: Apr. 22, 1974

[21] Appl. No.: 462,844

Related U.S. Application Data

[63] Continuation of Ser. No. 209,618, Dec. 20, 1971, abandoned.

[52] U.S. Cl. ............ 329/204, 307/321, 324/DIG. 1, 329/166, 332/47
[51] Int. Cl. ............ H03d 1/54
[58] Field of Search ............ 332/47; 329/166, 204; 324/DIG. 1; 307/321

[56] References Cited

UNITED STATES PATENTS

| | | | |
|---|---|---|---|
| 2,460,012 | 1/1949 | Hurault | 332/47 X |
| 3,012,192 | 12/1961 | Lion | 324/DIG. 1 |
| 3,688,206 | 8/1972 | Eide | 329/204 |

*Primary Examiner*—Alfred L. Brody
*Attorney, Agent, or Firm*—Darrell G. Brekke; Armand G. Morin, Sr.; John R. Manning

[57] ABSTRACT

A transducer and frequency discriminator circuit including a four-terminal circulating diode bridge, a first pair of capacitors connected in series across two terminals of the bridge, and a second pair of capacitors, or other impedance elements, connected in series across the other two terminals of the bridge. A source of balanced alternating electrical energy for energizing the circuit is coupled between the commonly connected plates of the first pair of capacitors and the commonly connected plates of the second pair of capacitors. Due to the operation of the diode bridge, the sum of the resultant charges developed on the first pair of capacitors is proportional to the relationship between the respective capacitors of the second pair, and consequently, an output voltage taken across the first pair of capacitors will be proportional to that relationship.

11 Claims, 14 Drawing Figures

INVENTORS
JOHN DIMEFF
DEAN R. HARRISON

BY

[signature]
ATTORNEY

INVENTORS
JOHN DIMEFF
DEAN R. HARRISON
BY
ATTORNEY

INVENTORS
JOHN DIMEFF
DEAN R. HARRISON

BY

ATTORNEY

DIODE-QUAD BRIDGE CIRCUIT MEANS

The invention described herein was made by employees of the United States Government and may be manufactured and used by or for the Government for governmental purposes without the payment of any royalties thereon or therefor.

This application is a continuation of U.S. Pat. application Ser. No. 209,618 filed Dec. 20, 1971, now abandoned.

BACKGROUND OF THE INVENTION

1. Field of the Invention

The present invention relates generally to electrical measuring apparatus and more particularly to transducer and discriminator circuits utilizing a four-terminal circulating diode bridge in combination with various impedance elements to produce an output signal which is proportional to a relationship between at least two of the impedance elements.

2. Description of the Prior Art

Certain types of transducer circuits can also be used as frequency discriminator circuits. Where one of these types of circuits is utilized as a transducer circuit, the frequency of the energizing signal is usually maintained constant, and the value of one of more of the impedance elements is varied to produce an output. Where the circuit is used as a discriminator circuit, the impedances of the various impedance elements are usually held constant and the input frequency is varied to produce an output. In the former case, the output signal is proportional to an impedance change from a reference value, while in the latter case, the output signal is proportional to the frequency of the input signal.

Many prior art transducer/discriminator circuits have utilized diode impedance bridges wherein diodes form two arms of the bridge and capacitors and/or resistors form the other two arms. In such circuits, the resistors serve as discharge elements for the capacitors following each charging cycle. Examples of such circuits, may be found in the U.S. Pats. to Mayes, No. 2,929,020; Lion, No. 3,012,192; Lion, No. 3,260,934; Lode, No. 3,271,669; Lode, No. 3,318,153; and Harrison, et al., No. 3,545,275. Among the disadvantages of these prior art types of circuits are that the sensitivity of the circuit usually depends upon the characteristics of the non-varied impedance element and upon the waveform of the energizing signal source; the circuit is usually frequency dependent, and the source impedance of the circuit is usually determined at least in part by the values of the resistors.

SUMMARY OF THE INVENTION

An object of the present invention is the provision of a transducer/discriminator circuit which provides an accurate output voltage for a static or dynamic change in impedance or frequency over a wide temperature range using a minimum of circuit components.

Another object of the present invention is the provision of a transducer/discriminator circuit which is substantially more sensitive than prior art circuits.

Briefly, a transducer/discriminator circuit in accordance with the present invention (hereinafter called simply "transducer circuit") includes a four-terminal circulating diode bridge, a first pair of capacitors connected in series across two terminals of the bridge, and a second pair of capacitors, or other impedance elements, connected in series across the other two terminals of the bridge. A source of alternating electrical energy for energizing the circuit is coupled between the commonly connected plates of the first pair of capacitors and the commonly connected plates of the second pair of capacitors. Due to the operation of the diode bridge, the sum of the resultant charges developed on the first pair of capacitors is proportional to the relationship between the respective capacitors of the second pair and consequently, an output voltage taken across the first pair of capacitors will be proportional to that relationship.

Certain advantages of the present invention will no doubt become apparent to those of ordinary skill in the art after having read the following detailed description of the preferred embodiments which are illustrated in the several figures of the drawings.

IN THE DRAWINGS

DETAILED DESCRIPTION OF THE PREFERRED EMBODIMENT

Figure 1:
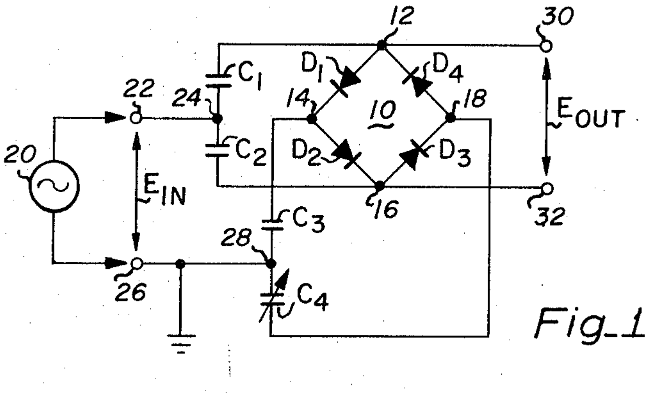
FIG. 1 is a schematic diagram illustrating a simplified embodiment of a transducer circuit in accordance with the present invention.

Referring now to FIG. 1 of the drawings, a simplified embodiment of a circuit in accordance with the present invention is illustrated which can be used as either a transducer circuit for developing a DC output signal proportional to the change in impedance of a variable impedance transducer, or as a frequency discriminator circuit for developing a change in output voltage proportional to a change in frequency. The illustrated circuit includes a four-terminal diode bridge 10 having terminals 12, 14, 16 and 18 consecutively coupled together by four diodes $D_1$, $D_2$, $D_3$ and $D_4$. The diodes $D_1 - D_4$ are polarized in current circulating relationship to form a bridge circuit generally referred to as a circulating diode-quad.

Connected in series between the bridge terminals 12 and 16 are a pair of capacitors $C_1$ and $C_2$ which are preferably matched and of equal value. Coupled in series between the bridge terminals 14 and 18 is a first impedance element, which may include a fixed capacitor $C_3$, and a second impedance element which may include a variable capacitor $C_4$. Where the circuit is used as a transducer circuit, the variable capacitor $C_4$ comprises the operative portion of a capacitive transducer, the physical embodiment of which depends upon the particular application. The capacitance of capacitor $C_3$ is typically chosen as the mid-range value of capacitor $C_4$. Alternatively, capacitor $C_3$ could be the variable element or both $C_3$ and $C_4$ can be varied in a differential manner to produce differentially varying capacitances.

For energizing the transducer circuit with an alternating input signal $E_{in}$, a signal source 20 is coupled between a first input terminal 22, which is connected to a circuit junction 24 between the commonly connected plates of capacitor $C_1$ and capacitor $C_2$, and a second input terminal 26, which is connected to a circuit junction 28 between the commonly connected plates of capacitor $C_3$ and capacitor $C_4$. Signal source 20 may be any source of alternating electrical energy capable of providing a signal of alternating polarity. A first output terminal 30 is coupled to bridge terminal 12 and a second output terminal 32 is coupled to bridge terminal 16.

The output signal $E_{out}$ developed across terminals 30 and 32 will be proportional to the difference in the capacitance of capacitors $C_3$ and $C_4$. This can be understood by referring to FIG. 2 of the drawings, which shows the excitation waveform $E_{in}$ and a positive DC output signal $E_{DC}$ which are present at output terminals 30 (at output terminal 32 a similar waveform and DC output are developed except that the DC voltage is negative). During the time that $V_1$ (the positive portion of $E_{in}$) is applied, diode $D_1$ is forward biased charging capacitor $C_3$ to a value.

$$q_1 = V_1 C_3. \tag{1}$$

A like amount of charge is, of course, also removed from capacitor $C_1$. When the input voltage $E_{in}$ then reverses polarity, diode $D_1$ is back biased and turned OFF, and diode $D_4$ is forward biased by $V_2$ (the negative portion of $E_{in}$) causing capacitor $C_4$ to be charged to a value $$q_2 - V_2 C_4. \tag{2}$$

Since the net charge on capacitor $C_1$ must be zero, that is $$\Delta Q = q_1 - q_2 = 0 \tag{3}$$

it can be shown that $$V_1 C_3 = V_2 C_4 \tag{4}$$

or rearranging, that $$(V_1/V_2) = (C_4/C_3). \tag{5}$$

Figure 2:
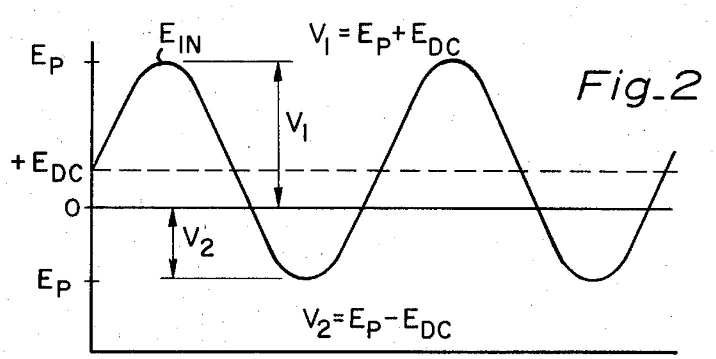
FIG. 2 is a diagram illustrating the operational characteristics of the transducer circuit shown in FIG. 1.

From FIG. 2 it will be noted that $V_1$ may be expressed as:

$$V_1 = E_p + E_{DC} \tag{6}$$

and $V_2$ can be expressed as $$V_2 = E_p - E_{DC}, \tag{7}$$

where $E_p$ is the peak voltage of $E_{in}$, and $\pm E_{DC}$ is the appropriate DC output voltage at terminals 30 and 32.

Substituting these values into equation (5) gives $$(V_p + E_{DC})/V_p - E_{DC}) = (C_4/C_3). \tag{8}$$

By algebraic manipulation the voltage $E_{DC}/V_p$ developed at output terminal 30 can be solved for and expressed as $$(E_{DC}/V_p) = (C_3 - C_4)/(C_3 + C_4). \tag{9}$$

In a similar manner it can be shown that the voltage developed at output terminal 32 is $$(E_{DC}/V_p) = +(C_3 - C_4/C_3 + C_4), \tag{10}$$

where only the polarity has changed. By measuring the total voltage $E_{out}$ developed across output terminals 30 and 32, a voltage doubling effect is obtained which can be expressed as $$(E_{DC}/V_p) = 2(C_3 - C_4)/(C_3 + C_4). \tag{11}$$

For a differential change in capacitors $C_3$ and $C_4$, that is, where $$C_3 = C_0 - \Delta C \tag{12}$$

and $$C_4 = C_0 + \Delta C, \tag{13}$$

the sensitivity of the output can be calculated from equation (11) and is expressed as $$(\Delta E_{DC}/V_p/\Delta C/C) = 2. \tag{14}$$

Thus, for a differential change in $\Delta C/C$ of ±1% and an exciting potential ($E_{in}$) of ±10 volts, the change in output signal $\Delta E_{out}$ is approximately 200 millivolts. As much as 600 millivolts can be obtained before the silicon diodes utilized in the preferred embodiment produce a saturating effect. Noise levels as low as 0.026 microvolts rms/$B^{1/2}$ (where $B$ is the band width in $H_z$) have been measured. This means that a fractional ($\Delta C/C$) change in capacitance of $2 \times 10^{-9}/B^{1/2}$ can be measured with this circuit.

Since the signal voltage $E_{in}$ is supplied from an excitation generator 20 at a selected frequency $f_e$, and since the signal current, $I_s$, flows through capacitors $C_3$ and $C_4$ in series, the source impedance $X_s$ of the transducer in the circuit is $$X_s = (C_3 + C_4/2\pi f_e C_3 C_4). \tag{15}$$

For signal frequencies much lower than $f_e$, the transducer capacitance acts as a resistor with an effective value $R_e = X_s$. This equivalent resistive source is then loaded by $C_1$, $C_2$, shunting cable capacitance, and by loading elements such as $R$, $C$, and $L$ connected across the output terminals. Furthermore, so long as the values of capacitors $C_1$ and $C_2$ are much greater than the value of capacitor $C_3$ and $C_4$, the potentials at output terminals 30 and 32, relative to circuit ground, remain relatively uneffected by change in the frequency of source 20.

Figure 3:
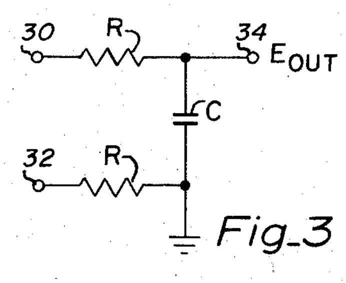
FIGS. 3–5 illustrate alternative means for providing a single-ended output in the transducer circuit illustrated in FIG. 1.
Figure 4:
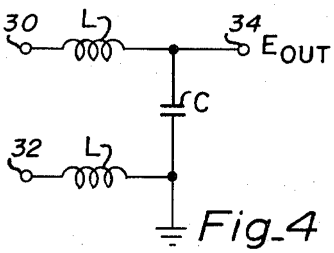
Figure 5:
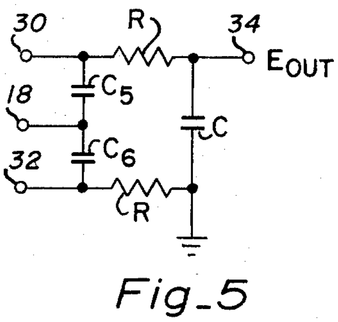

The circuit illustrated in FIG. 1 can be converted from a differential output device to a single-ended output device through the use of output circuits such as those illustrated in FIGS. 3, 4 and 5. Like numbered terminals are to be connected to like numbered terminals. In the FIG. 3 embodiment the resistors $R$ should be of equal value for symmetrical performance. Note that the resistors R will add to the source impedance. The relationship between the values of $R$ and $C$ should be $$(1/\omega_{out}) >> RC >> (1/\omega_{in}) \qquad (16)$$

where $\omega_{in}$ is the angular frequency of the energizer $rf$ voltage and $\omega_{out}$ is the highest angular frequency of the signal to be detected.

Where it is desirable that the static source impedance not be influenced by the output circuit, the resistors $R$ may be replaced by the inductors L as shown in FIG. 4.

The output circuit illustrated in FIG. 5 includes a variable capacitor $C_5$ connected in series with a fifth capacitor $C_6$ between terminals 30 and 32, and in combination with the RC components shown in the previous single-ended output circuits. When the terminals 30, 18 and 32 are connected to the like numbered terminals of the FIG. 1 embodiment, capacitor $C_5$ can be utilized as the variable circuit element in place of capacitor $C_4$. The capacitors $C_5$ and $C_6$ can exist either as added lumped capacitors or as the junction capacitances of the diodes. In the case of junction capacitance, the diodes can be diffused upon a pressure sensitive membrane in such a way as to enhance the piezo-capacitance property of the junction and thus produce a pressure transducer. A piezo-capacitance device, not necessarily limited to semi-conductor junctions, can also be used for capacitors $C_3$ and $C_4$ to provide maximum sensitivity.

Figure 6:
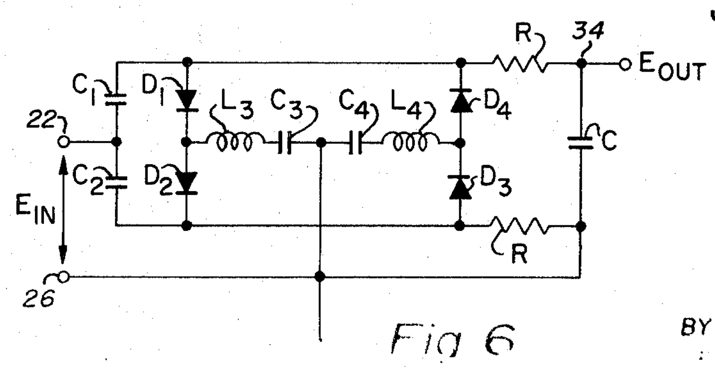
FIGS. 6–13 are schematic diagrams illustrating alternative embodiments of transducer circuits in accordance with the present invention.

In FIG. 6, a pair of inductors $L_3$ and $L_4$ have been added in series with capacitors $C_3$ and $C_4$ respectively, to produce an ultra-sensitive capacitive transducer circuit, the operation of which depends upon the Q of the inductors and the frequency to which two LC circuits are tuned. This circuit is obviously frequency sensitive and has the capability of performing efficiently as a frequency discriminator. This series tuned circuit also has low source impedance.

Figure 7:
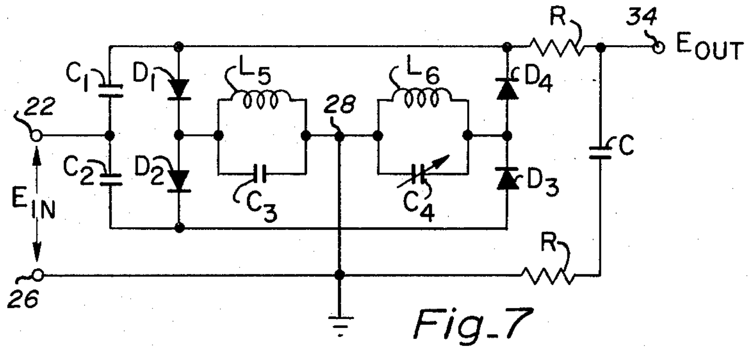

A parallel-tuned circuit as illustrated in FIG. 7 which includes an inductor $L_5$ coupled in parallel with capacitor $C_3$, and an inductor $L_6$ coupled in parallel with capacitor $C_4$. This circuit likewise performs well as a frequency discriminator but has a higher source impedance and produces less output signal than the FIG. 6 embodiment.

Figure 8:
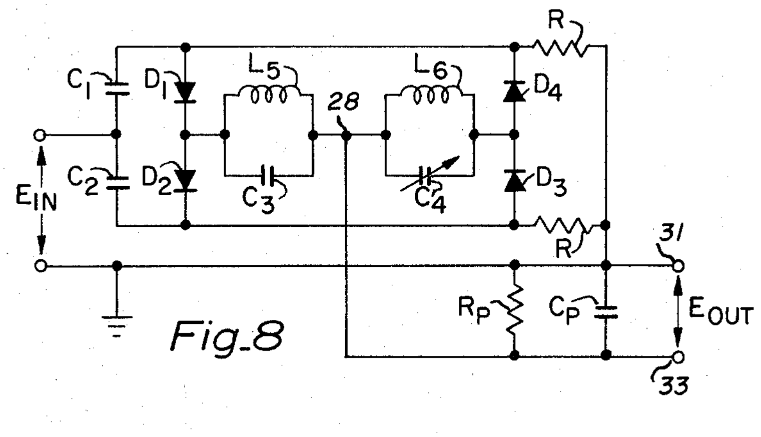

Another novel method of taking an output from the parallel tuned circuit illustrated in FIG. 7 is shown in FIG. 8. In this embodiment, the output is taken across a pair of output terminals 31 and 33 between which a parallel RC circuit, including the resistor $R_p$ and capacitor $C_p$, is connected.

Figure 9:
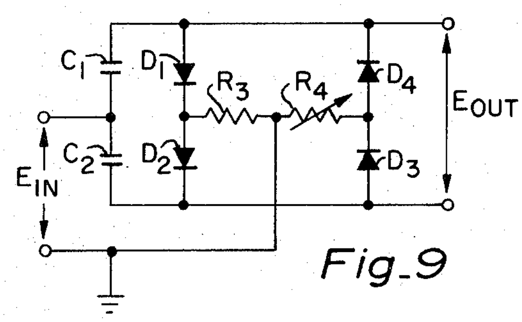
Figure 10:
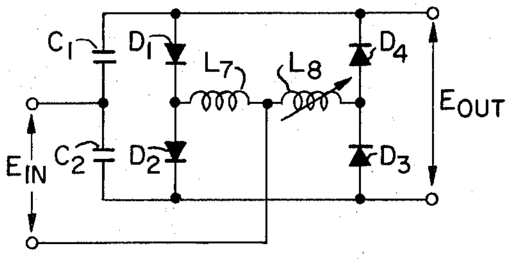

Still another alternative embodiment of the present invention is shown in FIG. 9 of the drawing. This embodiment is similar to that illustrated in FIG. 1 except that the resistors $R_3$ and $R_4$ have been substituted for the capacitors $C_3$ and $C_4$. In this circuit the output can be expressed as $$(E_{out}/V_p) = 2(|Z_1| - |Z_2|/|Z_1| + |Z_2|) \qquad (17)$$

where $Z = X_C, X_L, R$ or any combination thereof.

Where an inductive transducer is to be utilized to perform a particular measurement, the fixed inductor $L_7$ and variable inductor $L_8$ can be substituted for the resistors $R_3$ and $R_4$ respectively, of the FIG. 9 embodiment as illustrated in FIG. 10. In this case, the output signal $E_{out}$ is a measure of the change in the inductance of the inductor $L_8$.

Figure 11:
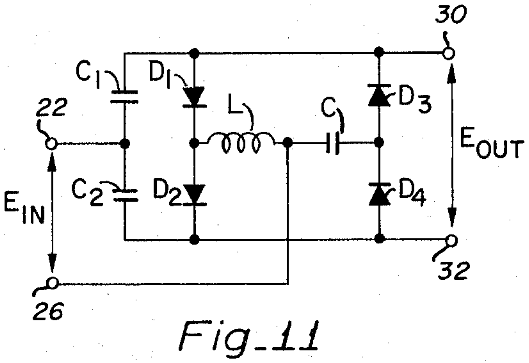
Figure 12:
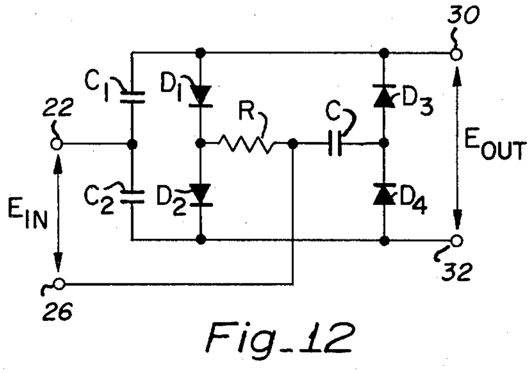
Figure 13:
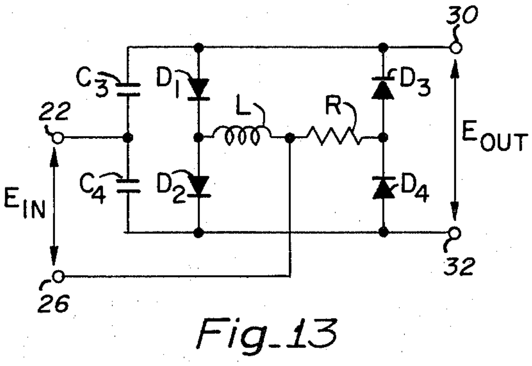

In FIGS. 11, 12 and 13, additional frequency discriminator circuits in accordance with the present invention are illustrated. In these circuits, an inductor L or resistor R is substituted for one or both of the capacitive elements shown in the FIG. 1 embodiment. In each of these circuits the center frequency is that frequency at which the impedances of the two impedance elements are equal.

Figure 14:
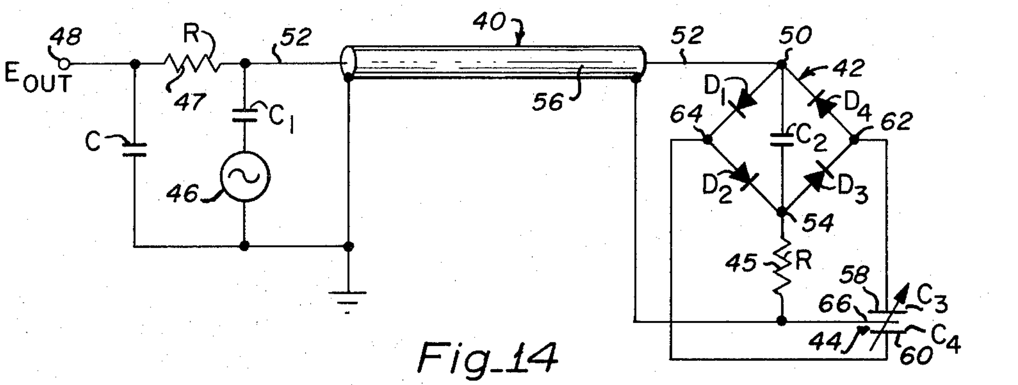
FIG. 14 is a schematic diagram illustrating a transducer circuit utilizing a single pair of conductors as a means of exciting a remote transducer and extracting an output signal therefrom.

In each of the above circuits at least three leads are required to energize the circuit and obtain an output signal therefrom. However, in FIG. 14, a modification is illustrated which is arranged so that a single co-axial cable 40 may be used to both excite the transducer and extract an output signal therefrom. In this embodiment, a first circuit is provided at the remote end of cable 40 including a circulating diode bridge 42, a capacitor $C_2$, a resistor 45, and a differential capacitor 44. At the other end of cable 40 a second circuit is provided including a signal source 46, a capacitor $C_1$, a resistor 47, a capacitor C, and an output terminal 48.

More specifically, the bridge terminal 50 is connected to one end of the inner conductor 52 of cable 40 while bridge terminal 54 is coupled through the resistor 45 to the outer conductor 56 of cable 40. The outer plates 58 and 60 of differential capacitor 44 are coupled to the bridge terminals 62 and 64 respectively, while the inner plate 66 is coupled to outer conductor 56. The capacitance between plate 58 and plate 66 develops a capacitance $C_3$, while the capacitance between plate 60 and 66 develops a capacitance $C_4$. Capacitor $C_2$ is coupled between bridge terminals 50 and 54.

At the other end of cable 40, capacitor $C_1$ and signal source 46 form a series circuit between the other end of inner conductor 52 and outer conductor 56 (circuit ground). Output terminal 48 is coupled to inner conductor 52 through the resistor 47 and is coupled to outer conductor 56 by capacitor C. In operation, the circuit of FIG. 14 operates identically in theory and practice to that of the FIG. 1 embodiment with the circuit of FIG. 5 connected to terminals 30 and 32. In FIG. 1 the excitation voltage is coupled to the diode-quad at terminals 12 and 16 through capacitors $C_1$ and $C_2$ where both capacitors are connected at terminal 28. The performance of the circuit is unaffected if $C_2$ is connected to terminals 12 and 16 instead of 24 and 16 since $C_2$ continues to function as a means of coupling the excitation voltage to terminal 16 of the diode-quad.

Among the advantages of the present invention over the prior art are that the circuit output is independent of frequency; the circuit output is independent of wave form as long as symmetry exists; no purely resistive elements are needed in the capacitive transducer circuits; circuits provided in accordance with the present invention are up to twice as sensitive as prior art circuits; the low source impedance produces extremely low noise outputs of less than 2 microvolts peak-to-peak; and the circuits can be used for either R, L, or C type transducers or for frequency discriminator applications with little, if any, modification.

Although the above description has been directed to several preferred embodiments which are shown in simplified form, it is contemplated that many modifications will become apparent to those of ordinary skill in the art after having read this disclosure. It is therefore to be understood that the description is by way of illustration only, and is in no manner to be taken as limiting. Accordingly, it is intended that the appended claims be interpreted as covering all modifications which fall within the true spirit and scope of the invention.

What is claimed is:

1. A transducer circuit, comprising:

first and second input terminals;

a diode bridge including first, second, third and fourth bridge terminals consecutively coupled together by four diodes polarized in circulating relationship;

a signal source for developing a signal of balanced alternating polarity across said first and second input terminals;

a first capacitor coupling said first input terminal to said first bridge terminal, and a second capacitor coupling said first input terminal to said third bridge terminal; and a first impedance means coupling said second bridge terminal to said second input terminal, and a second impedance means coupling said forth bridge terminal to said second input terminal, the impedance of at least one of said first and second impedance means being variable, and the impedances of each of said first and second capacitors being small with respect to the impedances of each of said first and second impedance means at the frequency of said signal source, whereby an output signal developed across said first and third bridge terminals is proportional to the difference between the impedances of said first impedance means and said second impedance means divided by the sum of the impedances of said first impedance means and said second impedance means.

2. A transducer circuit as recited in claim 1 wherein said first impedance means includes a fixed capacitor, and said second impedance means includes a variable capacitor.

3. A transducer circuit as recited in claim 2 wherein said first impedance means further includes a first inductor in series with said fixed capacitor, and said second impedance means further includes a second inductor in series with said variable capacitor.

4. A transducer circuit as recited in claim 2 wherein said first impedance means further includes a first inductor in parallel with said fixed capacitor, and said second impedance means further includes a second inductor in parallel with said variable capacitor.

5. A transducer circuit as recited in claim 1 wherein said first impedance means includes a fixed resistor, and said second impedance means includes a variable resistor.

6. A transducer circuit as recited in claim 1 wherein said first impedane means includes a fixed inductor, and said second impedance means includes a variable inductor.

7. A transducer circuit as recited in claim 1 and further comprising:

a first output terminal and a second output terminal;

a third impedance means coupling said first bridge terminal to said first output terminal;

a fourth impedance means coupling said third bridge terminal to said second output terminal; and a third capacitor coupling said first output terminal to said second output terminal.

8. A transducer circuit, comprising:

first and second output terminals;

a first capacitor and a second capacitor forming a first series circuit coupling said first output terminal to said second output terminal;

a first diode and a second diode polarized in a first common direction and forming a second series circuit coupling said first output terminal to said second output terminal;

a third diode and a fourth diode polarized in a second common direction and forming a third series circuit coupling said first output terminal to said second output terminal;

a first impedance means and a second impedance means forming a fourth series circuit coupling the circuit junction between said first and second diodes to the circuit junction between said third and fourth diodes; and a source of alternating current coupling the circuit junction between said first and second capacitors to the circuit junction between said first and second impedance means, whereby an output signal developed across said first and second output terminals is proportional to the difference between the impedances of said first impedance means and said second impedance means divided by the sum of the impedances of said first impedance means and said second impedance means.

9. A transducer circuit as recited in claim 7 wherein said first output terminal is connected to said first and second series circuits by a first resistor, said second output terminal is connected to said first and second series circuits by a second resistor, and said first output terminal is capacitively coupled to said second output terminal.

10. A transducer circuit, comprising:

a first output terminal and a second output terminal;

first, second and third series circuits coupled in parallel between said first and second output terminals, said first series circuit including first and second capacitors coupled together at a first circuit junction, said second series circuit including first and second diodes coupled together at a second circuit junction and polarized in a first common direction, and said third series circuit including third and fourth diodes coupled together at a third circuit junction and polarized in a second common direction;

a first impedance means and a second impedance means coupled together at a fourth circuit junction and forming a fourth series circuit coupling said second circuit junction to said third circuit junction; and a source of alternating current coupling said first circuit junction to said fourth circuit junction, whereby an output signal developed across said first and second output terminals is proportional to the difference between the impedances of said first impedance means and said second impedance means divided by the sum of the impedances of said first impedance means and said second impedance means.

11. A transducer circuit as recited in claim 10 wherein said first impedance means and said second impedance means have different impedance characteristics.

* * * * *